UNITED STATES PATENT OFFICE 2,238,874

ISOALLOXAZINES AND MANUFACTURE THEREOF

Richard Kuhn and Friedrich Weygand, Heidelberg, Germany, and Arthur Herbert Cook, London, England, assignors to Winthrop Chemical Company, Inc., New York, N. Y., a corporation of New York No Drawing. Application July 3, 1935, Serial No. 29,732. In Germany July 12, 1934

31 Claims. (Cl. 260—211)

This invention relates to isoalloxazines substituted at the nitrogen atom in the 9-position and to a process of manufacturing the same.

In accordance with the present invention isoalloxazines substituted at the nitrogen atom in the 9-position are obtainable by subjecting N-monosubstituted aromatic orthodiamines to condensation with an alloxane compound. The condensation proceeds for instance in accordance with the following reaction scheme:

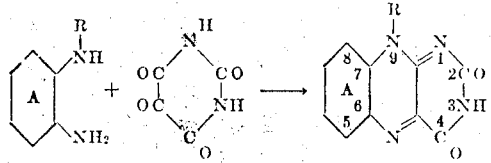

In the formulae the nucleus marked A designates an aromatic ring system and the substituent R represents an alkyl, cycloalkyl or aryl group, such as methyl, hydroxyethyl, propyl, dihydroxypropyl, tetrahydroxyamyl, pentahydroxyamyl, cyclohexyl and benzyl groups. The aromatic nucleus marked A may contain substituents, such as alkyl, particularly methyl groups.

The isoalloxazines substituted at the nitrogen atom in the 9-position represent yellow dyestuffs which may be reduced to leuco compounds by the usual reducing agents. The N-hydroxyalkylated compounds, particularly the polyhydroxy-alkylated compounds are of pharmacological interest since they exert vitamin $B_2$ action.

The condensation of the N-monosubstituted aromatic ortho-diamines with alloxane or N-monosubstituted products thereof to the isoalloxazines preferably is performed in acid solution, for instance, in the presence of mineral acids, such as hydrochloric, hydrobromic, sulfuric, nitric and phosphoric acid; but the condensation may also be performed in neutral solution while using salts of the N-monosubstituted aromatic ortho-diamines with the mineral or organic acids. In general heating of the reaction mixture is advantageous. When using the N-monosubstituted aromatic ortho-diamines in the form of the free base, the condensation is preferably effected in the presence of a higher boiling solvent, such as nitrobenzene, pyridine, and the like.

Instead of using the N-monosubstituted aromatic ortho-diamines in the above described condensation process also N-monosubstituted aromatic ortho-nitroamines may be used as the initial materials. In this case the reduction of the said ortho-nitroamines to the corresponding diamine and the condensation with alloxane or its monosubstituted products may be carried out in one working stage only if the N-monosubstituted aromatic ortho-nitroamines are caused to react with the alloxane compound in the presence of the reducing agent which is required for the reduction of the nitro group. In this case primarily a leuco compound of the isoalloxazine compound is formed which is subsequently dehydrogenated by treatment with a dehydrogenating agent. As reducing agents there may be used the media which are customarily used for the reduction of nitro groups, for instance, tin, stannous chloride, iron, trivalent titanium, etc. Suitable dehydrogenating agents are for instance atmospheric oxygen, potassium permanganate, halogens, quinoid dyestuffs, etc. The afore described method of working has proved particularly suitable for the manufacture of the N-hydroxyalkylated isoalloxazines while using ortho-hydroxyalkylamino-nitrobenzenes as the initial materials.

Instead of the alloxane or its monosubstituted products, for instance, N-alkylalloxanes, derivatives of alloxane may be used in the above described condensation process. Such suitable derivatives are, for instance, hydroxypyrimidones and their condensation products which are formed by the reduction of alloxane, for instance, dialuric acid, isodialuric acid and alloxantine.

When using in the appended claims the term "alloxane compound" it is understood that the aforementioned derivatives are to be included within this term.

When using the said alloxane derivatives the condensation may also be performed while using the N-monosubstituted aromatic ortho-nitroamines in the presence of a reducing agent necessary for the reduction of the nitro group of the nitroamine. Also in this case the leuco compounds primarily formed are dehydrogenated to the corresponding isoalloxazines by treatment with the dehydrogenating agent. As reducing and dehydrogenating agents also in this case the customary media referred to above may be used.

In the above described condensation processes the yields of the isoalloxazines sometimes are injured by substituents attached to the benzene nucleus of the aromatic diamine as well as by the nature of the substituent attached to the one amino group of the aromatic diamine. It may be that the reaction in such cases partially stops half way, so that only the primary amino group of the aromatic diamine reacts with the alloxane compound while splitting off water.

It has further been found that the condensation of the N-monosubstituted aromatic diamines, particularly also of those containing substituents, such as alkyl groups attached to the nucleus and a hydroxyalkyl group attached to the one amino group, with the alloxane compound may be effected with a better yield when carried out in the presence of boric acid. Working in a practically anhydrous solvent, such as glacial acetic acid, has proved to be particularly advantageous in this case. Likewise when working in this manner the N-monosubstituted aromatic ortho-nitroamines may be used as the initial materials and the condensation may be carried out in the presence of a reducing agent. Leuco compounds of the isoalloxazines obtained in this case are dehydrogenated to the isoalloxazines as indicated above. But it is also possible to first reduce the N-monosubstituted aromatic ortho-nitroamines in the presence of boric acid and, for instance, glacial acetic acid to form the corresponding diamino compound, and then effect condensation with the alloxane compound. If leuco compounds are primarily obtained in this case they are again dehydrogenated as described above. The action of the boric acid perhaps may be explained by the formation of a complex compound of the boric acid with one of the reacting components.

When using boric acid as a medium favoring the condensation of the reacting components also the above mentioned condensation products of N-monosubstituted diamines with an alloxane compound, particularly of N-hydroxyalkylated aromatic diamines, in which condensation products only the primary amino group of the N-monosubstituted diamine has reacted with the alloxane compound while splitting off water, may be further condensed to the corresponding isoalloxazines. Perhaps the alloxane compound forms a complex compound with the boric acid. If the N-hydroxyalkylated compounds are used perhaps ester-like compounds may be formed with the boric acid. In every case it has been found that also other ester-like derivatives of the N-mono-hydroxyalkylated aromatic diamines, particularly of those mineral acids which tend to form complex compounds, for instance, sulfuric and phosphoric acid, may be condensed with alloxane compounds to the isoalloxazines. If ester groups are still contained in the condensation products, the acid radicals may be split off by treatment with saponifying agents. Ester-like derivatives of the N-mono-hydroxyalkylated aromatic diamines may be obtained, for instance, by esterifying N-hydroxyalkylated aromatic ortho-nitroamines with sulfuric or phosphoric acid and subsequent reduction of the nitro group. Phosphoric acid esters are obtained in a particularly advantageous manner when reacting upon the hydroxyalkylated compound with phosphorus oxychloride in the presence of pyridine.

The esterification may also be effected with the condensation products which are formed by reaction of the primary amino group of the N-mono-hydroxyalkylated ortho-diamines with the alloxane compound with splitting off of water and thereafter the condensation to the isoalloxazine, or the esterification with the acids and the condensation to the isoalloxazine may be effected simultaneously.

The invention is further illustrated by the following examples without being restricted thereto:

Example 1.—1 mol of N-methyl-ortho-phenylene-diamine is dissolved in dilute hydrochloric acid and heated to boiling with 1 mol of alloxane-hydrate for 5 minutes. The reaction product which separates is purified by dissolving it in dilute alkali; the solution is extracted with chloroform, then acidified with acetic acid and the dyestuff, the 9-methyl-isoalloxazine of the formula

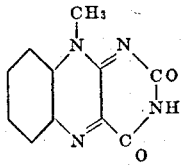

is extracted with chloroform. It crystallizes from acetic acid in coarse orange colored prisms which decompose after previous dark coloration at about 392° C. with foaming.

In a corresponding manner by the action of N-ethyl-ortho-phenylenediamine upon alloxane the 9-ethyl-isoalloxazine in the form of bitter tasting prisms is obtained. They melt above 330° C. with decomposition and may be recrystallized from glacial acetic acid.

The above described synthesis may also be performed with good yields when replacing the hydrochlorides of the N-alkyl-ortho-phenylenediamines by salts of these bases with sulfuric acid, nitric acid, phosphoric acid, oxalic acid, or by bringing the bases in solutions of the acids specified into reaction with alloxane. The synthesis succeeds particularly well in solvents which do not contain water especially if the bases are given the opportunity to form salts, for instance, by heating of the components in acetic acid.

In high boiling solvents, such as nitrobenzene, pyridine and others also the free bases—though slowly and less complete—enter into reaction with alloxane with the formation of the green fluorescent isoalloxazines.

Example 2.—1.1 gram of N-methyl-ortho-phenylene-diamine are dissolved in 20 ccs. of 2 normal hydrochloric acid and treated with a solution of 2.5 grams of monomethylalloxane-sodium bisulfite. The reaction mixture is heated to boiling for about 5 minutes, whereupon the 3.9-dimethyl-isoalloxazine of the formula

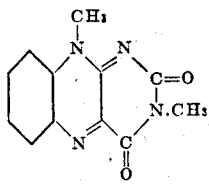

precipitates in long orange-yellow needles. The new product may be recrystallized from dilute acetic acid and melts with decomposition at 320–325° C. It is insoluble in alkalies.

Example 3.—1 mol of 1.3-dimethyl-5-amino-6-methylamino-benzene-hydrochloride is heated to boiling in aqueous solution with 1 mol of alloxane for about 5 minutes. The dyestuff precipitates as crystalline powder which may be recrystallized from acetic acid. In conformity with other isoalloxazines which are unsubstituted in the 3-position the 6.8.9-trimethyl-isoalloxazine of the formula

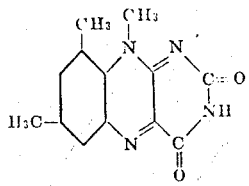

is soluble in dilute alkalies.

*Example 4.*—1 mol of the hydrochloride of 1-(2'.3'.4'.5' - tetrahydroxy - 1' - amylamino) - 2 - amino-4.5-dimethylbenzene is heated with 1 mol of alloxane in aqueous solution. The precipitated reaction product is recrystallized from water or dilute acetic acid. The 6.7-dimethyl-9-(2'.3'.4'.5' - tetrahydroxy-1'-amyl) -isoalloxazine forms ocher-yellow needles.

In an analogous manner the 9 - (2'.3' - di hydroxy - 1' - propyl) - isoalloxazine is obtained from 1 mol of the hydrochloride of 2'.3'-dihydroxy-1'-propylamino-2-aminobenzene and 1 mol of alloxane. It forms yellow crystals which melt at about 300° C. with decomposition.

The 1-polyhydroxyalklamino-2-aminobenzenes used as initial materials for the above specified reaction may be obtained by condensation of ortho-nitro-halogen-benzenes with polyhydroxyalkylamines and reduction of the nitro compounds formed.

*Example 5.*—1 mol of the hydrochloride of 1.2-dimethyl-4-amino - 5 - n - amylaminobenzene is heated with 1 mol of alloxane in glacial acetic acid. The 6.7-dimethyl-9-n-amyl-isoalloxazine is obtained in the form of yellow crystals melting at 295–300° C. with decomposition. They are readily soluble in chloroform, little soluble in water and may be extracted from caustic soda solution by means of chloroform.

In a corresponding manner the 6.7-dimethyl-9-allyl-isoalloxazine is obtained from the hydrochloride of 1.2-dimethyl-4-amino-5-allylaminobenzene; the 9-phenyl-isoalloxazine is obtained from the hydrochloride of 1-phenylamino-2-aminobenzene in the form of yellow needles which are soluble in chloroform, and the 9-benzyl-isoalloxazine is obtained from the hydrochloride of the 1-benzylamino-2-aminobenzene in the form of yellow crystals.

*Example 6.*—1-(2'.3'.4'.5' - tetrahydroxy - 1' - amylamino) - 2 - nitrobenzene, obtained in the form of a crystalline orange colored product from 1.1 mol of ortho-bromo-nitrobenzene, 1 mol of 1-arabinamine and 10 mols of pyridine by 3 hours' heating to about 130° C. and removal of the pyridine by distilling off in vacuo while repeatedly adding water, is washed with ether in order to remove eventually adhering excess ortho-bromo-nitrobenzene, and taken up in strong hydrochloric acid, then excess alloxane is added and the mixture is reduced by means of stannous chloride. After the reduction is completed the mixture is diluted with water and a potassium permanganate solution is added drop by drop. After the addition of sodium acetate an intense yellow, light green fluorescent solution is obtained from which no dyestuff is extracted by means of chloroform and from which the iso-alloxazine compound formed may be isolated by adsorption by means of fuller's earth and elutriation of the adsorbate by means of pyridine.

When starting with dimethyl-ortho-nitroaminobenzene the 6.7-dimethyl-(2'.3'.4'.5'-tetrahydroxy-1'-amylamino)-isoalloxazine is obtained in the form of a yellow crystal powder in a corresponding manner.

*Example 7.*—1 mol of 1 - methylamino - 2 - amino-4.5-dimethylbenzene is boiled in hydrochloric acid solution with 1 mol of alloxantine for 5 minutes. On cooling the 6.7.9 - trimethyl-isoalloxazine precipitates in the form of thin needles which may be purified by recrystallization from glacial acetic acid.

*Example 8.*—1 mol of 1-(2'.3'.4'.5'-tetrahydroxy-1'-amylamino) - 2-nitro-4.5-dimethylbenzene are reduced by stannous chloride and hydrochloric acid in the presence of 2 mols of dialuric acid. After the reaction is complete the leuco compounds formed is dehydrogenated by means of potassium permanganate and the dyestuff thus obtained, the 6.7-dimethyl-9-(2'.3'.4'.5'- tetrahydroxyamyl) - isoalloxazine, is isolated in a purified state as indicated in Example 6.

*Example 9.*—1 part by weight of 1.2-dimethyl-4-nitro-5-1-arabitylaminobenzene is heated to boiling with 5 parts by weight of crystallized boric acid in 50 parts by weight of glacial acetic acid for a short time. After cooling the nitro the group is reduced by shaking the mixture with excess zinc dust while cooling with running water. When filtering the mixture a completely colorless filtrate is obtained. To effect condensation to the isoalloxazine compound the solution is slowly added to a suspension of 2 parts by weight of finely powdered alloxane in 20 parts by weight of glacial acetic acid at normal temperature while stirring. The condensation sets in at once. After 2 hours' standing, whereby a yellow precipitate separates, the mixture is diluted with 500 parts by weight of water and dried at 60 mm. pressure, redistilled with water and then twice distilled off with an abundant quantity of methanol at normal pressure on the water bath. The residue is dissolved in hot water and the solution is concentrated until crystals appear. The solution is then cooled to 0° C., the precipitate is sucked off and washed. After drying 0.65 part by weight of 6.7-dimethyl-9-1-arabityl-isoalloxazine, melting at 293° C. with decomposition, are obtained. From the mother lye still more but less pure 6.7-dimethyl-9-1-arabityl-isoalloxazine may be obtained.

The 6.7-dimethyl-9-d-ribityl-isoalloxazine is obtained in analogous manner when starting with 1.2-dimethyl-4-nitro-5-d-ribitylaminobenzene.

We claim:

1. The process which comprises reacting a salt of a monocyclic arylene ortho diamine substituted in one amino group by a substituent selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid to form an isoalloxazine.

2. The process which comprises reacting a salt of a monocyclic arylene ortho diamine substituted in one amino group by a substituent selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid while heating, to form an isoalloxazine.

3. The process which comprises reacting a salt of a monocyclic arylene ortho diamine substituted in one amino group by a substituent selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid in acid solution to form an isoalloxazine.

4. The process which comprises heating a monocyclic arylene ortho diamine substituted in one amino group by a substituent selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid in the presence of a high boiling organic solvent which is inert to the initial materials, to form an isoalloxazine.

5. The process which comprises reacting a salt of a monocyclic arylene ortho diamine substituted in one amino group by a substituted selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid in the presence of a solvent which is inert to the initial materials, to form an isoalloxazine.

6. Process as claimed in claim 1, in which the salt of the monocyclic arylene ortho diamine is produced in the reaction mixture by reduction of a corresponding ortho-nitroamine and the leuco compound of the isoalloxazine primarily formed is treated with a dehydrogenating agent.

7. The process which comprises reacting a salt of an N-mono-arabityl monocyclic arylene ortho diamine with an alloxane compound selected from the group consisting of alloxanes, N-alkylalloxanes and their bisulfite derivatives, hydroxypyrimidones, alloxantine, dialuric acid and isodialuric acid in the presence of a solvent which is inert to the initial materials, to form an isoalloxazine.

8. The process which comprises reacting a salt of a monocyclic arylene ortho diamine substituted in one amino group by a substituent selected from the group consisting of alkyl, cycloalkyl and benzyl groups with alloxane to form an isoalloxazine.

9. The process which comprises reacting a salt of a monocyclic arylene ortho diamine substituted in one amino group by a substituent selected from the group consisting of alkyl, cycloalkyl and benzyl groups with a hydroxypyrimidone to form an isoalloxazine.

10. The process which comprises reacting a salt of an N-mono-arabityl monocyclic arylene ortho diamine with alloxane to form an isoalloxazine.

11. Process as claimed in claim 8, in which the monocyclic arylene ortho diamine is produced in the reaction mixture by reduction of an N-mono-hydroxyalkylated ortho-nitroamine of the benzene series and the leuco compound of the isoalloxazine primarily formed is treated with a dehydrogenating agent.

12. The process which comprises reacting a monocyclic arylene ortho diamine substituted in one amino group by a substituent selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid in the presence of boric acid and a solvent which is inert to the initial materials to form an isoalloxazine.

13. The process which comprises reacting an N-mono-hydroxyalkylated monocyclic arylene ortho diamine with an alloxane compound selected from the group consisting of alloxanes, N-alkylalloxanes and their bisulfite derivatives, hydroxypyrimidones, alloxantine, dialuric acid and isodialuric acid in the presence of boric acid and a solvent which is inert to the initial materials to form an isoalloxazine.

14. The process which comprises reacting a monocyclic arylene ortho diamine substituted in one amino group by a substituent selected from the group consisting of alkyl, cycloalkyl and benzyl groups with an alloxane compound selected from the group consisting of alloxanes, N-alkylalloxanes and their bisulfite derivatives, hydroxypyrimidones, alloxantine, dialuric acid and isodialuric acid in the presence of boric acid and glacial acetic acid to form an isoalloxazine.

15. The process which comprises reacting an N-monohydroxyalkylated monocyclic arylene ortho diamine with an alloxane compound selected from the group consisting of alloxanes, N-alkylalloxanes and their bisulfite derivatives, hydroxypyrimidones, alloxantine, dialuric acid and isodialuric acid in the presence of boric acid and glacial acetic acid to form an isoalloxazine.

16. Process as claimed in claim 13, in which the N-mono-hydroxyalkylated monocyclic arylene ortho diamine is produced in the reaction mixture by reduction of an N-mono-hydroxyalkylated nitroamine of the benzene series and the leuco compound of the isoalloxazine primarily formed is treated with a dehydrogenating agent.

17. Process as claimed in claim 15, in which the N-mono-hydroxyalkylated monocyclic arylene ortho diamine is produced in the reaction mixture by reduction of an N-mono-hydroxyalkylated nitroamine of the benzene series and the leuco compound of the isoalloxazine primarily formed is treated with a dehydrogenating agent.

18. The process which comprises reacting an N-mono-hydroxyalkylated monocyclic arylene ortho diamine with alloxane in the presence of boric acid and glacial acetic acid to form an isoalloxazine.

19. Process as claimed in claim 18, in which the N-mono-hydroxyalkylated monocyclic arylene ortho diamine is produced in the reaction mixture by reduction of an N-mono-hydroxyalkylated nitroamine of the benzene series and the leuco compound of the isoalloxazine primarily formed is treated with a dehydrogenating agent.

20. The process which comprises reacting an N-mono-polyhydroxyalkyl-ortho-phenylenediamine with an alloxane compound selected from the group consisting of alloxanes, N-alkylalloxanes and their bisulfite derivatives, hydroxypyrimidones, alloxantine, dialuric acid and isodialuric acid in the presence of boric acid and a solvent which is inert to the initial materials to form an isoalloxazine.

21. The process which comprises reacting an N-mono-polyhydroxyalkyl-orthophenylenediamine with an alloxane compound selected from the group consisting of alloxanes, N-alkylalloxanes and their bisulfite derivatives, hydroxypyrimidones, alloxantine, dialuric acid and isodialuric acid in the presence of boric acid and glacial acetic acid to form an isoalloxazine.

22. Process as claimed in claim 20, in which the N-mono-polyhydroxyalkylated phenylenediamine is produced in the reaction mixture by reduction of an N-mono-polyhydroxyalkylated ortho-nitro-aminobenzene and the leuco compound of the isoalloxazine primarily formed is treated with a dehydrogenating agent.

23. Process as claimed in claim 21, in which the N-mono-polyhydroxyalkylated phenylenediamine is produced in the reaction mixture by reduction of an N-mono-polyhydroxyalkylated ortho-nitro-aminobenzene and the leuco compound of the isoalloxazine primarily formed is treated with a dehydrogenating agent.

24. 9-arabityl-isoalloxazines.

25. 6.7-dimethyl-9-1-arabityl-isoalloxazine.

26. Derivatives of 1.2-diamino-4.5-dimethylbenzene of the formula:

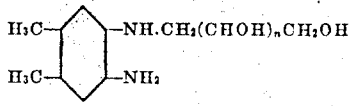

wherein $n$ is a numeral selected from the group consisting of the numerals 3 and 4.

27. The process which comprises reacting a salt of an N-mono-hydroxyalkylated monocyclic arylene ortho diamine with an alloxane compound selected from the group consisting of alloxanes, N-alkyl-alloxanes and their bisulfite derivatives, hydroxy-pyrimidones, alloxantine, dialuric acid and isodialuric acid in the presence of a solvent which is inert to the initial materials, the said salt of the diamine being formed in the reaction mixture by reduction of an N-mono-hydroxyalkylated monocyclic arylene ortho nitro amine, to form the leuco compound of an isoalloxazine and treating said leuco compound with a dehydrogenating agent.

28. The process which comprises reacting a salt of a compound of the general formula

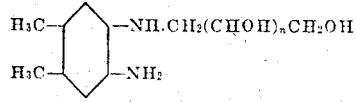

wherein $n$ is a numeral selected from the group consisting of the numerals 3 and 4, with an alloxane compound selected from the group consisting of alloxanes, N-alkylalloxanes and their bisulfite derivatives, hydroxypyrimidones, alloxantine, dialuric acid and isodialuric acid to form an isoalloxazine.

29. The process which comprises reacting a compound of the general formula

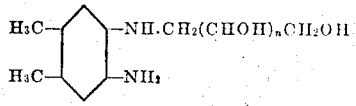

wherein $n$ is a numeral selected from the group consisting of the numerals 3 and 4, with an alloxane compound selected from the group consisting of alloxanes, N-alkylalloxanes and their bisulfite derivatives, hydroxypyrimidones, alloxantine, dialuric acid and isodialuric acid in the presence of boric acid and a solvent which is inert to the initial materials to form an isoalloxazine.

30. The process as claimed in claim 28 wherein the alloxane compound is alloxane.

31. The process as claimed in claim 29 wherein the alloxane compound is alloxane.

RICHARD KUHN.
FRIEDRICH WEYGAND.
ARTHUR HERBERT COOK.